May 23, 1961 R. H. GARDNER 2,985,259
DISC BRAKE
Filed June 17, 1958 4 Sheets-Sheet 1

FIG. I

INVENTOR.
RICHARD H. GARDNER
BY
Brown, Jackson,
Boettcher + Dienner
ATTYS.

May 23, 1961 R. H. GARDNER 2,985,259
DISC BRAKE

Filed June 17, 1958 4 Sheets-Sheet 4

INVENTOR.
RICHARD H. GARDNER
BY
Brown, Jackson,
Boettcher + Dienner
ATTYS.

United States Patent Office 2,985,259
Patented May 23, 1961

2,985,259
DISC BRAKE
Richard H. Gardner, Buchanan, Mich., assignor to Clark Equipment Company, a corporation of Michigan
Filed June 17, 1958, Ser. No. 742,613
9 Claims. (Cl. 188—72)

The present invention relates to disc brakes, and particularly, to improved actuating and adjusting means therefor.

Disc brakes have long been in use in various types of equipment in the heavy industry field, for example, in the wire rope winding drums which control the operation of crane shovels and the like. The brakes embody, essentially, a plurality of interfitting annular discs, alternate ones of which are connected respectively to a relatively stationary member and a relatively movable member, and means for applying an axially directed compressive force to the discs to cause the same forcibly to engage one another. A variety of force applying means have been proposed heretofore in the art which fall generally into two categories, namely, a single generally axially disposed means, and a plurality of circumferentially spaced means. The former is subject to practical drawbacks due to the size of the brake, the difficulty of applying force uniformly to a large disc by axial effort, and the fact that the brake is required to encircle a shaft or the like which extends through an annular member that is to be braked. For these reasons, the use of a plurality of annularly arranged, circumferentially spaced means is generally preferred. However, such means present the problems of securing uniform or equalized application of force at each means and of accommodating uniform adjustment of the force applying means as the brake discs becomes worn from use. Another problem encountered with the use of a plurality of force applying members has been the limited braking force that can be accomplished mechanically and the necessity for adoption of fluid pressure force applying means in large size and/or high power units.

One object of the present invention is to provide an improved disc brake including means for mechanically applying an equalized braking force to the discs at a plurality of circumferentially spaced points and for uniformly adjusting said means when necessary in a highly convenient manner.

Another object of the invention is to provide improved means for mechanically applying to the brake discs the large force required in large size and/or high power units, thereby to dispense with the need for fluid pressure means, especially where a high pressure system for actuating such means is not readily or economically available.

An additional object of the invention is to provide improved mechanical actuating means for disc brakes affording a greatly amplified mechanical advantage by virtue of an interdependent combination of the mechanical advantages of a lever, a gear connection, and a screw, thereby to convert low input energy to large braking force.

A further object of the invention is the provision of improved force applying means for disc brakes comprising a plurality of annularly arranged, circumferentially spaced screws carried by a relatively arranged, circumferentially spaced screws carried by a relatively stationary part of the device and each operatively engaging the disc assembly, a pinion carried by each of said screws, a ring gear meshed with each of said pinions for rotating the pinions an equal amount upon rotation of said gear, and means, preferably a lever secured to said gear, for effecting rotation thereof, whereby the lever, the gear-to-pinion advantage, and the screw connections multiply the input energy to apply a substantially magnified braking force to the discs at each screw, and each screw is advanced by exactly the same amount to apply the same force to each of several points on the disc assembly.

Yet another object of the invention is the provision of improved disc brake actuating and/or adjusting means comprising a plurality of nuts journalled in a relatively stationary part of the device adjacent the disc assembly, the nuts being annularly arranged concentric with the disc assembly and being disposed at equal circumferential spacing from one another, a screw threaded in each of the nuts and abutting at one end thereof against the disc assembly, a pinion secured to each of the nuts, and a ring gear meshed with each of the pinions, the ring gear being rotatable to simultaneously advance and retract said screws each an equal amount relative to the disc assembly.

A still further object of the invention is the provision of improved controlling means for disc brakes comprising cooperable nuts and screws as above described, a pinion carried by each screw, a first ring gear meshing with the screw carried pinions, a pinion carried by each nut, a second ring gear meshing with the nut carried pinions, and means for rotating the gears in opposite directions to advance the screws relative to the disc assembly.

Also included as an object of this invention is the provision of disc brake controlling means as above defined wherein the said first ring gear is employed to actuate the brake, the said second ring gear is used to adjust the brakes to compensate for wear, and means are provided for normally retaining said second ring gear in adjusted position, whereby said ring gears are effective, respectively, to apply a uniformly distributed braking force over the disc assembly and to adjust the brake uniformly throughout its circumference.

In addition to the above stated advantages, the described assembly facilitates independent adjustment of each force applying screw, especially upon initial assembly of the brake or subsequent to application of fresh lining material to the brake discs, in that temporary disconnection of either the screw pinion or the nut pinion from its respective ring gear, or of either the screw or the nut from its pinion, will permit adjustment of the respective screw independently of the other screws.

Also, the fact that the screws, the nuts, the screw pinions, and the nut pinions, respectively, are all identical, assures economical manufacture and assembly of the brake.

Other objects and advantages of the present invention will become apparent in the following detailed description of preferred embodiments of the invention.

Now, in order to acquaint those skilled in the art with the manner of making and using my improved disc brake controlling means, I shall describe, in connection with the accompanying drawings, preferred embodiments of my invention and preferred manners of making and using the same.

In the drawings, wherein like reference numerals indicate like parts:

Figure 1:
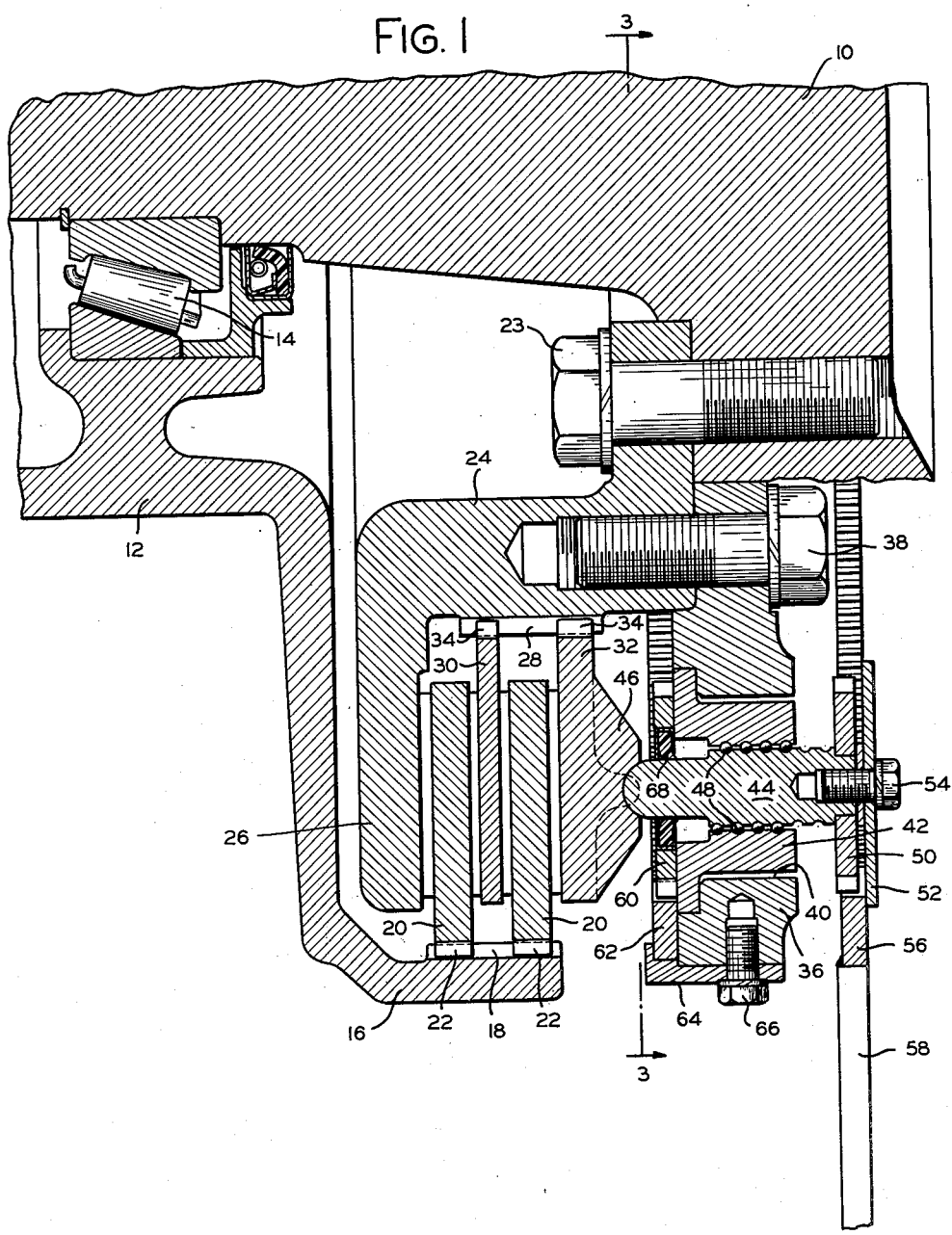
Figure 1 is a fragmentary vertical longitudinal section of a disc brake including one embodiment of my improved brake controlling means, the view illustrating substantially the lower half of the brake.

Referring now to the drawings, I have illustrated, by way of example, my improved disc brake controlling means embodied in a disc brake of generally conventional construction that could suitably be employed for governing the operation of the winding drum of a wire rope reeling device. The device includes a stationary support spindle 10 on which a drum 12 is rotatably mounted by means of a tapered roller bearing 14. The drum 12 adjacent one end thereof includes a radial flange terminating in an axially outwardly open cylindrical portion 16. The inner wall of the cylinder 16 is splined or provided with gear teeth, as indicated at 18, by means of which a pair of annular brake discs 20, having complementary teeth 22 on the outer periphery thereof, are connected to the drum 12 for movement axially thereof and for conjoint rotation therewith.

Mounted on a radially extending portion of the spindle 10, suitably by means of bolts 23, is an annular reaction member 24 which extends into the cylinder 16 inwardly of the discs 20 and which includes a radially outwardly extending disc or plate portion 26 that is disposed between the radial flange of the drum 12 and the innermost one of the discs 20. The reaction member 24, on the outer surface of the hub portion thereof, is splined or provided with gear teeth 28 by means of which a brake disc 30 and a pressure plate or reaction member 32, having complementary teeth 34 on the inner peripheries thereof, are slidably mounted on but retained against rotation relative to the spindle 10. The disc 30 is positioned between the discs 20 and the pressure plate 32 is disposed axially outward of the outermost one of the discs 20. The discs 20 are both provided on the opposite faces thereof with brake lining material of a conventional nature, whereby the two discs 20 are adapted frictionally to engage, respectively, the reaction member 24 and the disc 20 and the disc 30 and the pressure plate 32 thereby to brake the drum 12 relative to the spindle 10.

To the extent thus far described, the disc brake is of generally conventional construction.

In order for the brake to absorb torque, force must be applied in the axial direction to the pressure plate 32 to exert an axially compressive force on the discs 20 and 30 between the primary reaction members 24 and 32. To this end, the present invention provides improved means for advancing and retracting the pressure plate relative to the disc assembly, which means are all embodied in or carried by an annular body member 36 which is secured to the reaction member 24 and/or the spindle 10 to form a radially extending flange on the spindle which is disposed adjacent but axially outward of the pressure plate. As illustrated herein, the body member 36 is suitably secured to the reaction member 24 by a plurality of bolts 38 which are threaded into the hub of the reaction member.

At a plurality of points aligned in the axial direction with the plate 32, the body 36 of the brake controlling means is provided with counterbored holes therethrough which holes are annularly arranged at equal circumferential distances from one another on a common circle concentric with the plate 32, the disc assembly and the axis of rotation of the drum 12. By way of example, the body 36 is illustrated herein to have six such holes, the axes of adjacent ones of which are spaced 60 degrees apart. The holes are each counterbored at the face thereof adjacent the pressure plate and are each adapted to receive rotatably therein a flanged nut 42, the body of each nut extending into the respective hole 40 and the flange thereof engaging in the counterbore. Threadedly mounted in each of the nuts is a screw 44 which extends to opposite sides of the body or flange 36 and which is rounded at its inner end for engagement with the pressure plate 32. Preferably, the pressure plate is provided with a boss 46 thereon at the location of each screw, which boss defines a parti-spherical socket for reception of the rounded end of the respective screw. The threaded connection of the screw and nut may be effected in a variety of known manners, but I prefer to employ a ball screw type thread, including helical grooves in the nut and screw and balls 48 riding in said grooves, in order to minimize frictional resistance to rotation.

At the outer end thereof, each screw 44 carries a pinion or notched member 50 which is secured to or formed integral with the respective screw. For example, the screw could, as shown, include a square or polygonal shank and the pinion could have a complementary central aperture for coupling the pinion to the screw, a retainer 52 suitably being secured to the outer end of the screw, as by a bolt 54, to retain the pinion on the screw. Meshing with each of the screw carried pinions 50 is an annular ring gear 56 which encircles the pinions and is provided at its inner periphery with radially inwardly extending teeth complementary to the teeth or notches in the outer periphery of each pinion. The ring gear 56 is normally retained in axial cooperation with the pinions by means of the retainers 52, and the gear includes a radially outwardly extending lever arm 58 by means of which the gear may be rotated to effect rotation of each of said pinions an equal amount, whereby the screws 44 are each rotated and moved axially an equal amount, each to move the pressure plate 32 by an equal amount.

By virtue of the described coaction of the ring gear 56, the pinions 50 and the screws 44, pressure is applied uniformly to the pressure plate throughout its full circumference thereby to apply the brakes uniformly and assure uniform wear thereof. Moreover, the mechanical advantages obtained by the lever (the arm of which may be varied to adjust the mechanical advantage thereof), the gear connection (which advantage may also be adjusted by variation of the tooth ratio), and the screw (the advantage of which may likewise be adjusted by varying the pitch or lead) cooperate to magnify substantially the input force to convert small input energy to large braking force. Thus, the means of the present invention is capable of mechanically applying to the pressure plate 32 the large forces required to exert effective braking torque in large size and/or high power disc brake assemblies. The lever 58 may be actuated in a variety of manners, such as manually, mechanically, or by a relatively low pressure pneumatic means, and even this relatively small input energy is adequate to brake large equipment, whereby the present invention dispenses with the necessity for the high pressure fluid system heretofore required for actuation of a large disc brake assembly.

To the forward side of the body or flange 36, each of the nuts 42 carries a pinion or like toothed or notched member 60 which is secured to or formed integral with the flange of the nut. Meshing with each of the nut carried pinions is a second ring gear 62 which encircles the pinions 60 and is provided at its inner margin with radially inwardly extending teeth that complement the teeth or notches in the pinions. The ring gear 62 may suitably be retained against axial disassociation from the pinion 60 by means of a conventional nature (not shown) carried by the body or flange 36. Upon rotation of the ring gear 62 each of the pinions 60 and each of the nuts 42 is rotated an equal amount, thereby to cause each of the screws 44 to move axially an equal amount.

Figure 2:
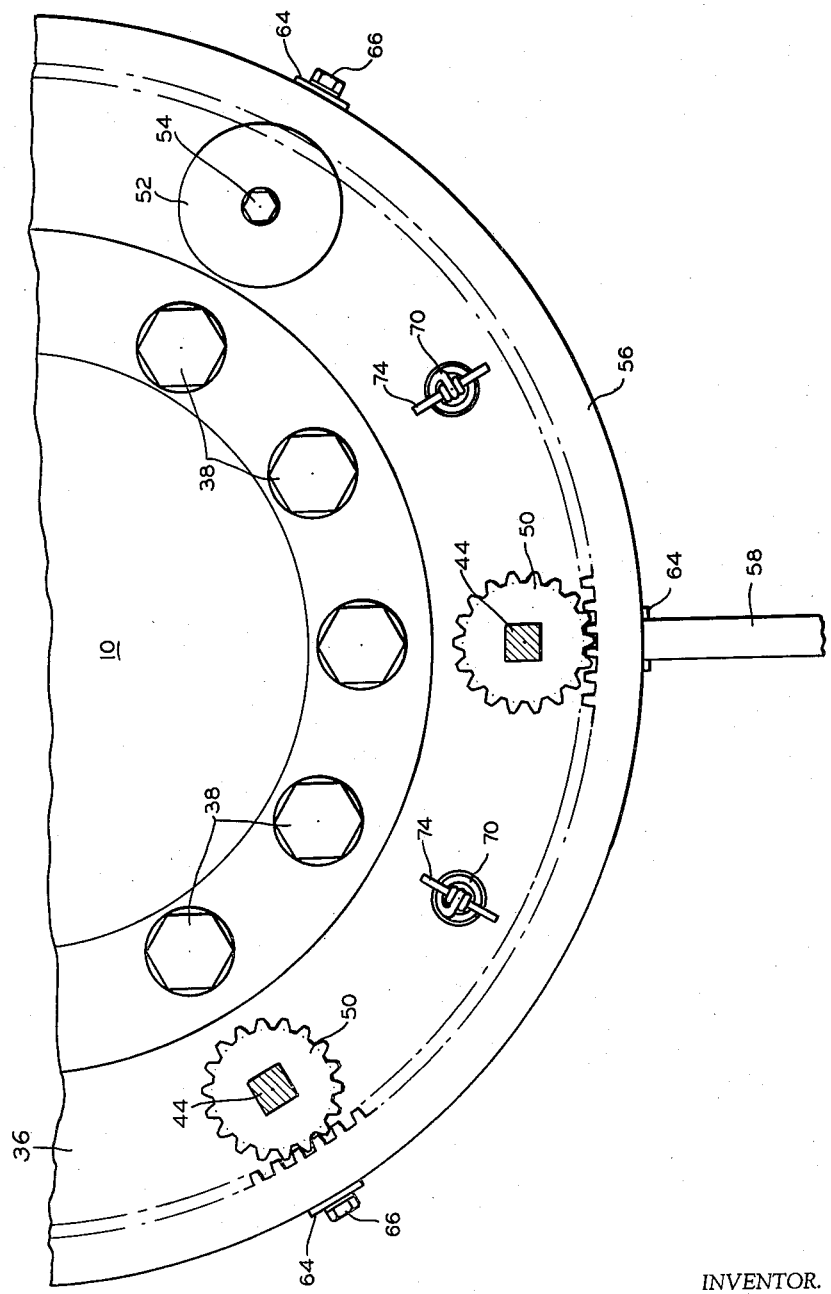
Figure 2 is an end elevation of the means illustrated in Figure 1, the view being taken from the right-hand side of Figure 1 and having certain of the gear retainers removed to illustrate the screw actuating gear and pinions.
Figure 3:
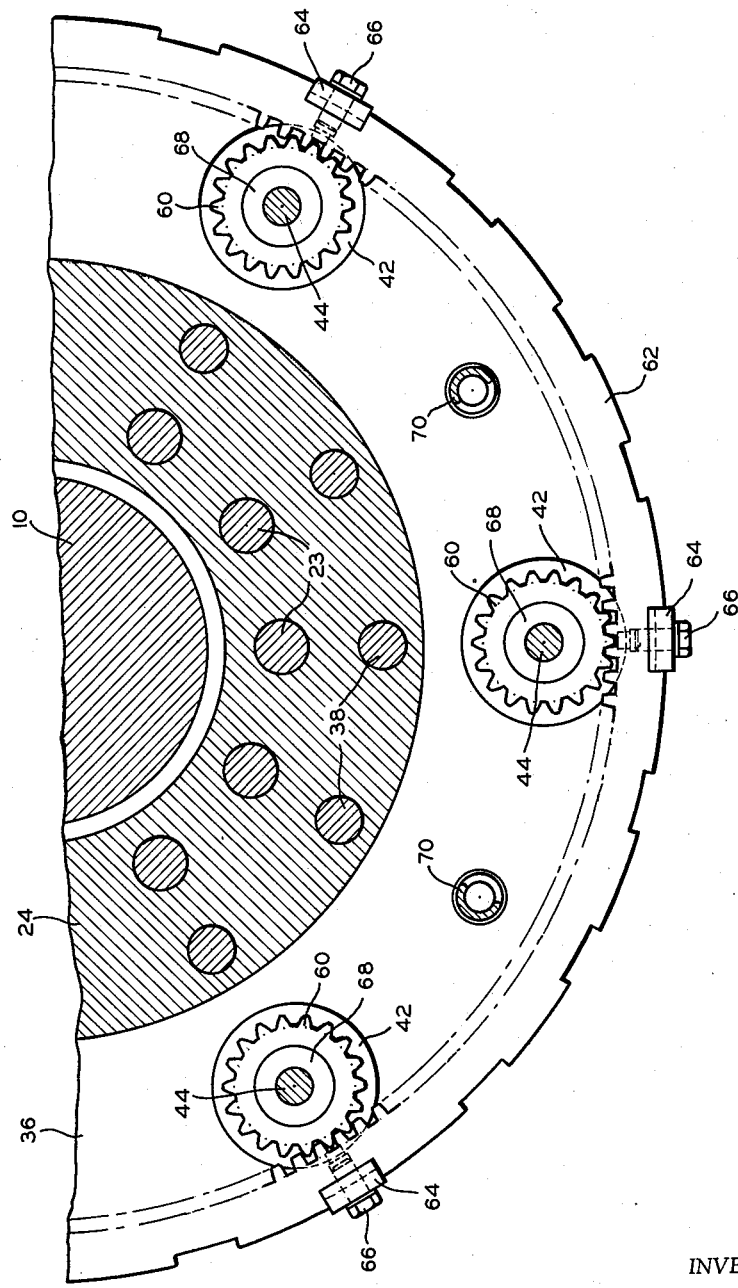
Figure 3 is a fragmentary cross-sectional view of the means illustrated in Figure 1, the view being taken substantially on line 3—3 of Figure 1 and showing my improved brake adjusting means.
Figure 4:
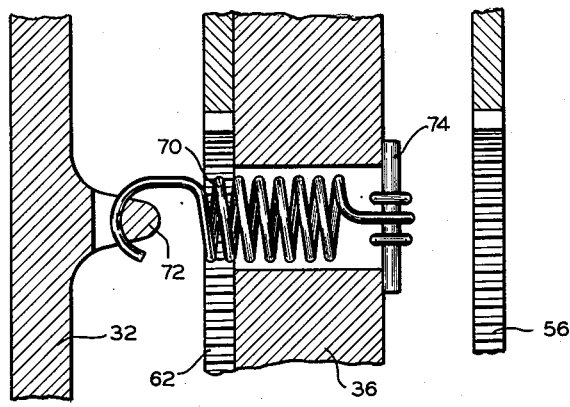
Figure 4 is a fragmentary sectional view illustrating the means employed for retracting the pressure applying disc of the brake assembly when brake applying force is released therefrom.

In use of the apparatus, input energy may be applied to the ring gears 56 and 62 in a variety of manners for a variety of purposes. In the first instance, if it is desired to apply an exceptional high braking force in a minimum time, both of the gears may be provided with lever arms, like the lever 58, and an expansion device may be operatively disposed between the two levers to cause, upon expansion thereof, rotation of the ring gear 56 in the clockwise direction (as the same is viewed in Figure 2) and rotation of the ring gear 62 in the opposite direction, whereby the screws are rapidly advanced each an equal amount toward the disc assembly due to the cumulative effect of rotating the screw and nut in opposite directions, and the mechanical advantages of the two levers, the two sets of gear and pinion means, and the screw threads are combined to exert a greatly magnified force. Alternatively, either of the ring gears may be held stationary while the other is rotated in the appropriate direction to apply or release the brakes, and/or the one ring gear that was held stationary may be employed essentially for adjusting the brakes.

In the preferred embodiment of the invention disclosed herein, I utilize the ring gear 56, the pinions 50 and the screws 44 for brake applying and releasing purposes, and the ring gear 62, pinions 60 and nuts 42 for brake adjusting purposes. To this end, only the ring gear 56 is provided with a lever arm and means are provided for normally locking the ring gear 62 to the body or flange 36 of the brake controlling means. Specifically, the outer periphery of the gear 62 is suitably notched or serrated and a locking member 64 having a tooth or the like for engagement with the edge of the gear is secured to the body by means of a bolt 66. In use of the brake assembly, as the friction facing material wears away and the brake requires adjustment, the lock 64 is released or removed and the ring gear 62 rotated the amount necessary to compensate for the said wear, the gear imparting equal rotation to each of the pinions, whereby the screws, which during this time are held against rotation by the gear 56, are advanced equally for uniform adjustment of the brake over its full circumference. This uniformity of adjustment coupled with the uniform application of braking force by the screws assures optimum utilization and ideal functioning of the brake components. When the ring gear 62 has been rotated to effect appropriate adjustment of the brake, the lock 64 is again applied thereto, whereby the gear 62, pinions 60 and nuts 42 are retained stationary and the nuts serve as reaction members for the screws upon actuation of the lever 58 to apply the brakes.

To seal the thread of each screw and nut assembly, the respective pinion 60 preferably carries a seal 68 engaging the head portion of the screw 44 for sealing between the screw and nut.

In the initial assembly of the device, or following repair of the brake components or relining of the brake discs 20, it is necessary to initially adjust the screws 44 so that each properly engages the pressure plate to exert a uniform braking force thereon. The force applying means of the present invention readily accommodates individual adjustment of the screws for the purposes indicated, since each screw and nut may either be released from its pinion or have its pinion released from the respective ring gear, whereby the nut or screw may individually be rotated to effect the necessary adjustment, whereafter the nut or screw, pinion and gear are assembled or re-assembled. Due to the relatively small lead of the thread between the nut and the screw, and the gear connection of the pinion and the gear, this adjustment may be effected to micrometer accuracy, thereby further to assure attainment of the objects of the invention.

To minimize brake wear, it is desirable that clearance be provided between the brake discs and the reaction members during rotation of the drum 12 relative to the spindle 10. To insure that this running clearance is afforded promptly upon release of the brake, as effected by retraction of the screws 44, I connect tension springs 70 between the pressure plate 32 and the body member or flange 36. Preferably, a spring is provided in the circumferential space between each adjacent pair of screws 44, each spring extending through a hole in the body 36 and being connected at its inner end to a hook-like projection 72 provided on the pressure plate 32 in alignment with each of the spring receiving holes in the member 36. At its outer end, each spring is anchored in a simple and expedient manner by means of a pin or strut 74 extending through the end loop of the spring and bridging across the respective hole.

Figure 5:
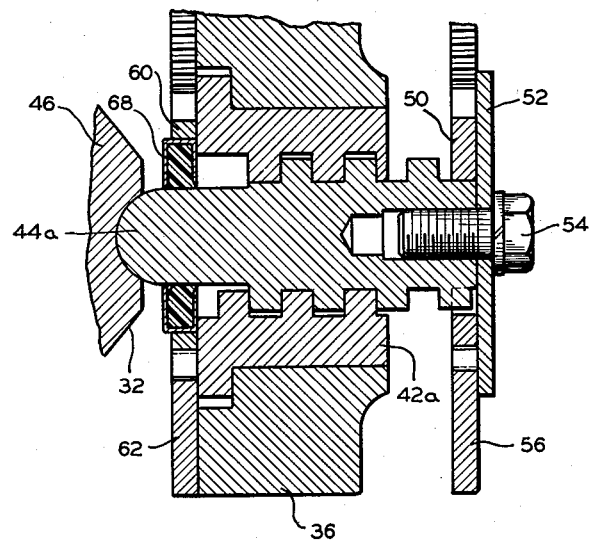
Figure 5 is a fragmentary sectional view of a modified form of my disc brake controlling means.

Referring now to Figure 5, I have shown a modified form of my disc brake controlling means, the principal departure of which from the embodiment previously described resides in the use of screw and nut members 44a and 42a, respectively, having direct threaded engagement by means of an acme thread rather than a ball type thread. Also in this modification, the body of the nut 42a is journalled in the hole in the supporting member or body 36 and the flange of the nut is loosely received in the counterbore, rather than vice versa as in the first described embodiment. In other respects, the modification is quite similar to the apparatus previously described except for minor constructional details. Its operation is the same as above described, and it produces the same marked advantages of applying a completely uniform force to the pressure plate of the brake at substantial mechanical advantage and of expediently accommodating uniform adjustment of the brake.

From the foregoing, it is believed apparent that the objects and advantages of the invention have been shown herein to be obtained in a convenient, economical and practical manner.

While I have illustrated and described what I regard to be the preferred embodiments of my invention, it is to be appreciated that various changes, rearrangements and modifications may be made therein without departing from the scope of the invention, as defined by the appended claims.

I claim:

1. In a disc brake having a pair of relatively movable members, and an assembly of brake discs disposed operatively between said members including a pressure plate for causing said discs to apply a braking force between said members, the improvement comprising a plurality of nuts journalled in one of said members adjacent the pressure plate, said nuts being annularly arranged concentric with the pressure plate and being disposed at equal circumferential spacing from one another, a screw threaded in each of said nuts and abutting at one end thereof against the pressure plate, a pinion carried by each of said screws, a ring gear meshed with each of the pinions that are carried by said screws, a pinion carried by each of said nuts, a ring gear meshed with each of said pinions that are carried by said nuts, and means for causing rotation of said ring gears in opposite directions for advancing and retracting said screws and the pressure plate relative to the disc assembly.

2. In a disc brake having a pair of relatively movable members, and an assembly of brake discs disposed operatively between said members including a pressure plate for causing said discs to apply a braking force between said members, the improvement comprising a plurality of nuts journalled in one of said members adjacent the pressure plate, said nuts being annularly arranged concentric with the pressure plate and being disposed at equal circumferential spacing from one another, a screw threaded in each of said nuts and abutting at one end thereof against the pressure plate, a pinion secured to each of said screws, a ring gear meshed with each of the pinions that are secured to said screws, a pinion secured to each of said nuts, a ring gear meshed with each of the pinions that are secured to said nuts, and means for causing rotation of at least one of said ring gears for applying a braking force to the pressure plate.

3. In a disc brake having a pair of relatively movable members, and an assembly of brake discs disposed operatively between said members including a pressure plate for causing said discs to apply a braking force between said members, the improvement comprising a plurality of nuts journalled in one of said members adjacent the pressure plate, said nuts being annularly arranged concentric with the pressure plate and being disposed at equal circumferential spacing from one another, a screw threaded in each of said nuts and abutting at one end thereof against the pressure plate, a pinion secured to each of said screws, a ring gear meshed with each of the pinions that are secured to said screws, a pinion secured to each of said nuts, a ring gear meshed with each of the pinions that are secured to said nuts, means for causing rotation of one of said ring gears in one direction for applying a braking force to the pressure plate, and means for causing rotation of the other of said ring gears in the opposite direction for advancing said screws and the pressure plate relative to the disc assembly for compensating for brake wear.

4. In a disc brake having a pair of relatively movable members, and an assembly of brake discs disposed operatively between said members including a pressure plate for causing said discs to apply a braking force between said members, the improvement comprising a plurality of nuts journalled in one of said members adjacent the pressure plate, said nuts being annularly arranged concentric with the pressure plate and being disposed at equal circumferential spacing from one another, a screw threaded in each of said nuts and abutting at one end thereof against the pressure plate, a pinion secured to each of said screws, a ring gear meshed with each of the pinions that are secured to said screws, a pinion secured to each of said nuts, a ring gear meshed with each of the pinions that are secured to said nuts, means for causing rotation of one of said ring gears in one direction for applying a braking force to the pressure plate, means for causing rotation of the other of said ring gears in the opposite direction for advancing said screws and the pressure plate relative to the disc assembly for compensating for brake wear, and means for normally locking said other ring to said one member for maintaining said screws and the pressure plate in adjusted position relative to the disc assembly.

5. In a disc brake having a relatively stationary member, a relatively movable member, and an assembly of brake discs disposed operatively between said members including a pressure plate for causing said discs to apply a braking force between said members, the improvement comprising a plurality of nuts journalled in the relatively stationary member adjacent the pressure plate, said nuts being annularly arranged concentric with the pressure plate and being disposed at equal circumferential spacing from one another, a screw threaded in each of said nuts and abutting at one end thereof against the pressure plate, first pinions secured respectively to each of said screws to the side of said stationary member opposite the pressure plate, a first ring gear meshed with each of said first pinions, second pinions secured respectively to each of said nuts to the side of said stationary member adjacent the pressure plate, a second ring gear meshed with each of said second pinions, a lever secured to and extending radially outward from said first ring gear for causing rotation of said first ring gear in one direction for applying braking force to the pressure plate, said second gear being rotatable in the opposite direction for advancing said screws and the pressure plate relative to the disc assembly for compensating for brake wear, and means for normally locking said second ring gear to the relatively stationary member for maintaining said screws and the pressure plate in adjusted position relative to the disc assembly.

6. In a disc brake as set forth in claim 5, means detachably securing each of said first pinions to the respective screw for accommodating disconnection of each screw from said first ring gear and individual adjustment of the screws relative to the pressure plate.

7. In a disc brake having a relatively stationary member and a relatively rotatable member defining an annular cavity therebetween concentric with the axis of rotation of the relatively rotatable member, and an assembly of annular brake discs mounted concentrically in said cavity between said members, said assembly including an annular pressure plate for applying pressure to the brake discs for braking the relatively rotatable member, the improvement comprising a body member forming a flange on the relatively stationary member opposed to the pressure plate, a plurality of nuts journalled in the said body member adjacent the pressure plate and parallel to the axis of rotation of the relatively rotatable member, the axes of said nuts lying on a common circle concentric with the pressure plate, said nuts being spaced at equal circumferential distances from one another on said circle, a screw threadedly engaged in each of said nuts and extending to opposite sides of said body member, said screws each abutting at the inner end thereof against the pressure plate, a pinion secured to each of said screws to the side of said body member opposite the pressure plate, a first annular gear encircling the pinions secured to said screws and having internal teeth meshed with each of said pinions, a pinion secured to each of said nuts to the pressure plate side of said body member, a second annular gear encircling the pinions secured to said nuts and having internal teeth meshed with each of said pinions, a lock for normally securing said second gear to said body member, a lever secured to and extending radially outward from said first gear for rotating the same to cause said screws to advance and retract relative to the disc assembly, said second gear, upon release of said lock, being rotatable to cause said nuts to advance and retract said screws relative to the disc assembly, and spring means carried by said body member and connected to the pressure plate between adjacent pairs of said screws for normally retracting the pressure plate relative to the disc assembly and for causing the pressure plate to move in accordance with the advancement and retraction of said screws.

8. In a disc brake having a plurality of annularly arranged axially movable means for applying braking force to a brake disc assembly, each of said means including means for translating rotary movement to axial movement and a pinion for imparting rotary movement thereto, and a concentric rotatable ring gear disposed radially adjacent said means and meshed with each of said pinions for simultaneously rotating the same equal amounts, the improvement comprising that said ring gear and said pinions are disposed exteriorly of the brake disc assembly and that said means each include detachable connecting means normally retaining said ring gear in driving engagement with each of said means and accommodating disconnection of said means from said gear for individual adjustment of said means thereby to cause said means to exert a uniform force on said disc assembly.

9. In a disc brake having a pair of relatively rotatable members and an assembly of brake discs disposed between said members, a plurality of screws operatively threaded in one of said members adjacent the discs, said screws being annularly arranged concentric with the discs and abutting at one end thereof against the discs, said screws extending at the other end thereof to the exterior of said members and said discs, a pinion carried by each of said screws to the exterior of said members and said discs, and a ring gear disposed to the exterior of said members and said discs and meshed with each of said pinions, said ring gear being rotatable simultaneously to advance and retract said screws each an equal amount for compressing and releasing the discs, said pinions each being detachably mounted on the respective screw for accommodating disconnection of each screw from said ring gear and individual adjustment of the screws relative to the discs.

References Cited in the file of this patent

UNITED STATES PATENTS

| | | |
|---|---|---|
| 1,922,303 | Kinzbach | Aug. 15, 1933 |
| 1,932,998 | Wood | Oct. 31, 1933 |
| 1,964,262 | Kinzbach | June 26, 1934 |
| 1,982,235 | Shepherd | Nov. 27, 1934 |